United States Patent [19]

Ryham

[11] Patent Number: 5,246,541
[45] Date of Patent: Sep. 21, 1993

[54] EVAPORATOR FOR LIQUID SOLUTIONS

[75] Inventor: Rolf Ryham, Suwanee, Ga.

[73] Assignee: A. Ahlstrom Corporation, Noormarkku, Finland

[21] Appl. No.: 699,764

[22] Filed: May 14, 1991

[51] Int. Cl.$^5$ .............................................. B01D 1/22
[52] U.S. Cl. ................... 159/13.2; 159/27.1; 159/27.4; 159/31; 159/43.1; 159/49; 165/115; 202/197; 202/236; 202/237; 203/89
[58] Field of Search ................. 159/13.2, 31, 27.1, 159/27.4, 43.1, 49, DIG. 2; 202/197, 236, 237; 203/89, 40; 165/115; 55/172, 187

[56] References Cited

U.S. PATENT DOCUMENTS

| | | |
|---|---|---|
| 1,003,912 | 9/1911 | Kestner ........................... 159/13.2 |
| 3,069,863 | 12/1962 | Dolphin et al. .................. 159/13.3 |
| 3,595,297 | 7/1971 | Berg .................................. 159/13.2 |
| 3,724,523 | 4/1973 | Mattern ........................... 159/28.1 |
| 3,849,232 | 11/1974 | Kessler et al. .................. 159/43.1 |
| 3,880,702 | 4/1975 | Troshenkin et al. ............ 159/13.2 |
| 3,970,512 | 7/1976 | Makinsky et al. .............. 159/13.3 |
| 4,054,485 | 10/1977 | Linder et al. .................... 159/13.2 |
| 4,383,887 | 5/1983 | Kühnlein et al. ............... 203/89 |
| 4,415,407 | 11/1983 | Longuet .......................... 159/13.2 |
| 4,545,853 | 10/1985 | Feres ............................... 202/236 |
| 4,762,592 | 8/1988 | Li .................................... 202/236 |
| 4,810,327 | 3/1989 | Norrmén ........................ 159/13.3 |
| 4,813,155 | 3/1989 | Jensen et al. .................. 159/DIG. 2 |
| 5,004,043 | 4/1991 | Mucic et al. ................... 159/13.2 |

FOREIGN PATENT DOCUMENTS

| | | | |
|---|---|---|---|
| 0990246 | 1/1983 | U.S.S.R. ............................ | 159/13.2 |
| 1274697 | 12/1986 | U.S.S.R. ............................ | 159/13.3 |

Primary Examiner—Virginia Manoharan
Attorney, Agent, or Firm—Cohen, Pontani, Lieberman, Pavane

[57] ABSTRACT

A falling film evaporator includes a chamber having a top and bottom tube plate; a plurality of vertical tubes each having an interior and exterior surface and extending through the chamber and being supported by the top and bottom tube plates; an inlet at the chamber for feeding heating medium into the chamber; a distributor above the tubes for feeding liquid to be evaporated into the tubes and for causing the liquid to be distributed as a falling film along the interior surface of the tubes so as to evaporate the liquid and generate vapor as the liquid passes in heat exchanging relationship with a heating medium present at the exterior surface of the tubes; a vapor space defined by a circumferential wall below the tubes; a plurality of vertically elongated spaced elements having a substantially U-shaped cross-section with inwardly pointing vertical edges for receiving the evaporated liquid and the vapor, the elements being arranged in a circumferential wall below the tubes within the vapor space spaced from the wall of the vapor space and including a conical bottom; a drainpipe in the bottom for discharging the separated liquid into the vapor space and outlets in the vapor space for separately discharging the vapor and the liquid therefrom.

5 Claims, 1 Drawing Sheet

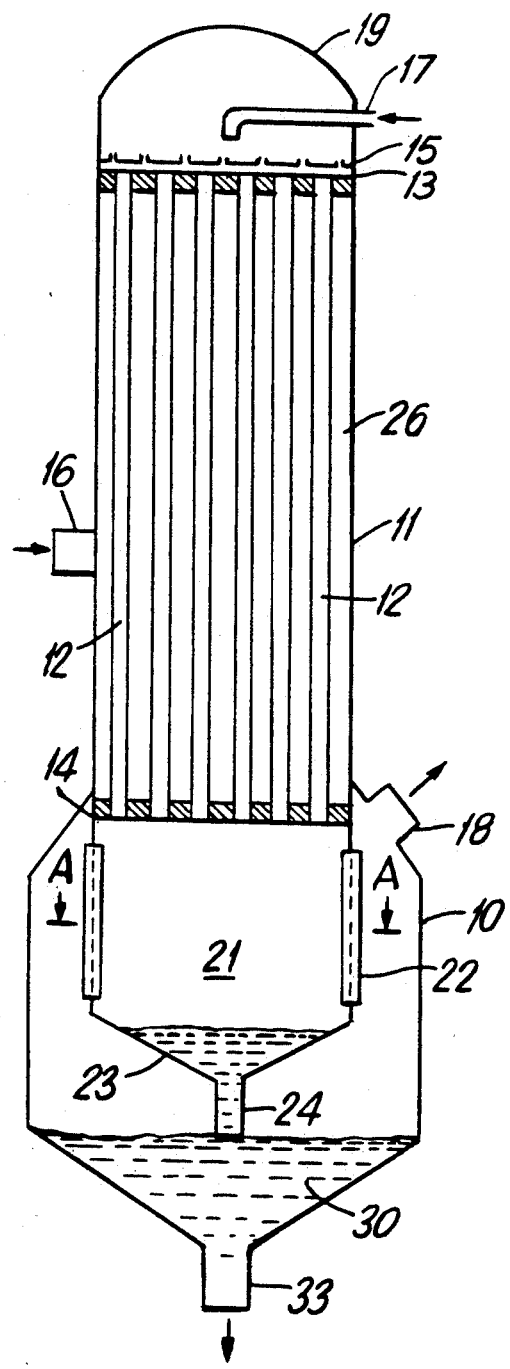
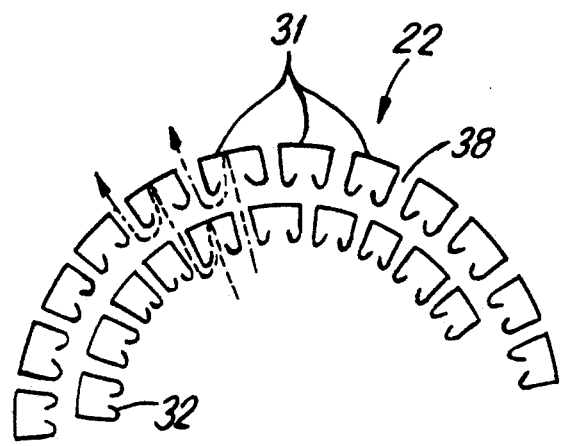
FIG. 2
FIG. 1

EVAPORATOR FOR LIQUID SOLUTIONS

FIELD OF THE INVENTION

The present invention relates to a falling film evaporator, and more particularly to an evaporator having a plurality of tubes and being equipped with a device for separating entrained droplets from the vapor generated in the evaporator.

BACKGROUND OF THE INVENTION

Tube-type falling film evaporators are widely used for evaporation of liquid solutions. The liquid to be evaporated is fed to the inside of a plurality of tubes and is evaporated thereon by indirect contact with heating steam flowing in a space surrounding the outside of the tubes. During the process, a mixture of liquid and vapor exits from the lower end of the tubes with relatively high velocity which mixture must be then separated in the same manner as in a Kestner-type evaporator using a large receiving space located below the tube bundle. For reasons of economy, e.g. recovery of chemicals, and environmental concerns, care must be taken that drops of liquid are not carried along by the vapor leaving the evaporator.

One object of the present invention is to improve the separation of liquid and vapor in the evaporator, so that the vapor space of the evaporator can be more effectively utilized and consequently smaller vapor spaces for a specific duty can be designed than heretofore possible.

SUMMARY OF THE INVENTION

According to the present invention a specially designed receiving space for the liquid/vapor mixture immediately below the evaporator tubes is provided within the vapor space. This liquid/vapor receiving space comprises a chamber formed by a preferably concentric, tubular wall spaced from the wall of the evaporator casing. The wall has a conical or tapered bottom part and is composed of spaced, vertically extending trough-shaped elements having U-shaped cross-section. The U-shaped elements are preferably arranged in one or more rows in staggered form, i.e. offset to each other, so that the U-shaped elements of one row are located in front of the space between the U-shaped elements of the next row and vice versa. Preferably, the end portions of each U-shaped element are bent to point inwardly toward the bottom of the U-shaped element thereby restricting the free outward flow of the vapor/liquid mixture once it has entered the tubes. The tube walls may be mounted on one or more plates and suspended from the end of the evaporator tubes within the vapor space.

The wall may also be formed by woven steel strips or fabric suspended on a simple framework. This woven steel fabric is arranged so that it either acts as a mesh pad or as an inertia device in known manner. The liquid/vapor mixture exiting from the tubes impinges on the inner surfaces of the trough-like elements which causes the liquid to be separated and to fall down, while the vapor will pass through the slots or spaces between the U-shaped elements and pass into the vapor space defined between the tubular wall member and the lower casing of the evaporator.

Accordingly, the falling film evaporator of the present invention comprises a chamber having a top and bottom tube plate; a plurality of vertical tubes each having an interior and exterior surface and extending through said chamber and being supported by said top and bottom tube plates; means at said chamber for feeding heating medium into said chamber; means above said tubes for feeding liquid to be evaporated into said tubes and for causing said liquid to be distributed as a falling film along said interior surface of said tubes so as to evaporate said liquid and generate vapor as said liquid passes in heat exchanging relationship with a heating medium present at said surface of said tubes; a vapor space defined by a circumferential wall below said tubes; means for receiving said evaporated liquid and said vapor, said receiving means being located below said tubes within said vapor space and comprising a chamber having a wall spaced from said wall of said vapor space and a conical bottom; an outlet in said bottom for discharging said liquid into said vapor space, said wall of said receiving means comprising means for separating droplets entrained in said vapor and for collecting said vapor; and means in said vapor space for separately discharging said vapor and said liquid therefrom. Preferably, the circular wall is formed of spaced, vertical, trough-shaped elements having a U-shaped cross-section. Also, the wall is preferably a circular wall and the U-shaped elements have end portions, said end portions being bent and pointing inward toward the bottom of said U-shaped elements. Finally, the vapor space is defined by a circular casing and the circular wall is concentric with the circular casing of the vapor space.

BRIEF DESCRIPTION OF THE DRAWINGS

The advantages of the present invention will be more fully understood from the following detailed description of a preferred embodiment of the invention, especially when that detailed description is read in conjunction with the accompanying drawings, wherein:

FIG. 1 is a vertical across sectional view of a falling film evaporator embodying the present invention; and FIG. 2 is a fragmentary sectional view along line A—A of FIG. 1.

DETAILED DESCRIPTION OF THE PRESENTLY PREFERRED EMBODIMENT

FIG. 1 shows a tube-type evaporator including a vapor space 10 defined by a casing below the tube bundles and chamber 11 disposed above the vapor space and having a dome-shaped cover 19 thereon. The chamber 11 has a plurality of vertical tubes 26 therein forming the tube bundles in which the liquid is heated to evaporation. Tubes 26 are supported in top and bottom tube plates 13 and 14, respectively. Above the top tube plate is a distributor plate 15 having apertures therein through which the liquid to be evaporated flows due to gravity onto the top tube plate in such a fashion that a preferably uniform thin film of liquid will flow from this tube plate along the inner surface of the tubes. The liquid is evaporated on the inner surface of the tubes by indirect heat transfer from a heating medium, such as steam, entering the chamber 11 through an inlet 16 and surrounding the outer surfaces of the tubes. The material to be evaporated is fed to the distributor plate via pipe 17.

A mixture of vapor and liquid flows from the evaporator tubes into the vapor receiving space located in the upper part of the cylindrical vapor space 10, which receiving space comprises a chamber 21 formed by a preferably concentric, tubular wall 22 having a conical bottom 23 and being spaced from the wall of the vapor space or casing 10. As shown in FIG. 2, which represents a fragmentary cross-sectional view along line A—A of FIG. 1, tubular or circular wall 22 is composed of a plurality of spaced, vertically elongated, trough-shaped elements 31 which are typically arranged in two rows with their respective openings facing inside toward the center of the structure. Preferably, elements 31 have a U-shaped cross-section for receiving the vapor/liquid mixture therein. Elements 31 form a droplet separating device by permitting the vapor/liquid mixture exiting from the evaporator tubes to enter the U-shaped structure with its free ends 32 pointing towards the inside thereof. Due to this structure, any liquid which separates in the inside of elements 31 will flow downward and be collected either in the conical bottom part 23 of the separation device or in liquid pool 30 at the lower part of the vapor space 10, or both. The mounting of the circular wall 22 within vapor space 10 can be achieved by any suitable means known to the person skilled in the art. For example, the plurality of U-shaped elements 31 may be suspended from the evaporator by mounting an annular sheet to the top of the respective elements 31 and attaching the sheet to the bottom end of the evaporator tube bundle. By whatever means the circular wall 22 with its plurality of elements 31 is attached to the evaporator tube bundle, it is important that the elements 31 are spaced apart so as to provide slots or openings for the vapor to pass therethrough. As shown in FIG. 2, the vapor will travel along the path indicated by the dotted arrows through the vertical openings 38 from the inside of chamber 21 into vapor space 10 from where it is removed through outlet 18. Liquid separated in chamber 21 collects at the tapered bottom part 23, while liquid separated within vapor space 10 collects in liquid pool 30 and both are removed from the evaporator through outlet 31.

As mentioned above, circular wall 22 comprises spaced, vertically extending, trough-shaped elements 21 having a U-shaped cross-section. Preferably, the free ends 32 of elements 31 are bent so as to point inward toward the bottom of the U-shaped structure. Preferably, U-shaped elements 31 which form the droplet separator are arranged in staggered rows so as to provide an obstructed passageway for the vapor/liquid mixture thereby causing the liquid to be separated from the vapor.

The separated liquid is removed via an outlet 31 and possibly recirculated to the inlet 17 via a suitable pipe arrangement (not shown).

It should be understood that the preferred embodiments described are for illustrative purposes only and are not to be construed as limiting the scope of the present invention which is properly delineated only in the appended claims.

What is claimed is:

1. A falling film evaporator comprising:
    an elongated chamber having a top and a bottom tube plate;
    a plurality of vertical tubes each having an interior and exterior surface and extending through said chamber and being supported by said top and bottom tube plates;
    means at said chamber for feeding heating medium into said chamber in contact with said exterior surface;
    means above said tubes for feeding liquid to be evaporated into said tubes and for causing said liquid to be distributed as a falling film along said interior surface of said tubes so as to evaporate said liquid and generate vapor therefrom;
    a vapor space defined by a circumferential wall below said tubes;
    means for receiving said liquid and said vapor, said receiving means being located below said tubes within said vapor space and comprising a conical bottom and a chamber connected to said bottom and having a wall spaced from said circumferential wall of said vapor space;
    an outlet in said bottom for discharging said liquid into said vapor space, said wall of said receiving means comprising a plurality of spaced means for separating droplets entrained in said vapor and for collecting said vapor; said plurality of spaced means including vertical, trough-shaped elements having a U-shaped cross-section; and
    means in said vapor space for separately discharging said vapor and said liquid therefrom.

2. The falling film evaporator of claim 1, wherein said wall of said receiving means is a tubular wall and said U-shaped elements have end portions, said end portions being bent and pointing inward toward the bottom of said U-shaped element.

3. The falling film evaporator of claim 2, wherein said vapor space is further defined by a circular casing and said wall of said receiving means is concentric with said circular casing of said vapor space.

4. The falling film evaporator of claim 1, wherein said trough-shaped elements define openings, the opening of each trough-shaped element facing radially inwardly.

5. The falling film evaporator of claim 4, wherein said trough-shaped elements are arranged in at least two rows in staggered configuration, such that the trough-shaped elements of one row are located in front of spaces defined between trough-shaped elements of an adjacent row of trough-shaped elements.

* * * * *